US008416068B2

(12) United States Patent
Li et al.

(10) Patent No.: US 8,416,068 B2
(45) Date of Patent: Apr. 9, 2013

(54) AUTOMATIC NETWORKING APPARATUS FOR VEHICLES

(75) Inventors: Wei Li, Shanghai (CN); Weihua Shi, Shanghai (CN)

(73) Assignee: Shanghai Baolong Automotive Corporation, Shanghai (CN)

( * ) Notice: Subject to any disclaimer, the term of this patent is extended or adjusted under 35 U.S.C. 154(b) by 223 days.

(21) Appl. No.: 12/946,545

(22) Filed: Nov. 15, 2010

(65) Prior Publication Data

US 2011/0241856 A1    Oct. 6, 2011

(30) Foreign Application Priority Data

Mar. 31, 2010    (CN) ...................... 2010 2 0146267 U

(51) Int. Cl.
*G08B 21/00*    (2006.01)

(52) U.S. Cl. .................... 340/431; 340/993; 340/5.81

(58) Field of Classification Search .................. 340/431, 340/993, 988, 5.81, 435, 441, 447, 466
See application file for complete search history.

(56) References Cited

U.S. PATENT DOCUMENTS

| 4,397,474 | A  | * | 8/1983 | Mettetal ...................... 280/476.1 |
| 4,816,802 | A  | * | 3/1989 | Doerksen et al. ............. 340/447 |
| 6,687,609 | B2 | * | 2/2004 | Hsiao et al. ................... 701/517 |
| 2008/0303648 | A1 | * | 12/2008 | Day ............................... 340/431 |

FOREIGN PATENT DOCUMENTS

CN          101300144        11/2008

OTHER PUBLICATIONS

International Search Report of related application PCT/CN2010/078186, dated Feb. 10, 2011, 4 pages total.
International Preliminary Report on Patentability of related application PCT/CN2010/078186, dated Oct. 2, 2012, 5 pages total.

* cited by examiner

*Primary Examiner* — Daniel Previl
(74) *Attorney, Agent, or Firm* — Hamre, Schumann, Mueller & Larson, P.C.

(57)    ABSTRACT

The present invention relates to an automatic networking apparatus for vehicles for a vehicle with a first component and a second replaceable component, and it comprises a first identity recognition module disposed on the first component and a second identity recognition module disposed on the second component. When the second identity recognition module turns into a networking mode, it transmits a low-frequency wake-up signal through a low-frequency signal transmission circuit to wake up the first identity recognition module. A low-frequency sensor circuit of the first identity recognition module is able to sense the low-frequency wake-up signal, and responds to the low-frequency wake-up signal to transmit an identity code corresponding to the first component through the high-frequency signal transmission circuit. The high-frequency signal receiving circuit of the second identity recognition module can receive the identity code of the first component and store the received identity code. In the following data transmission, the second identity recognition module can send the data with the identity code of the first component loaded with, so that a receiving apparatus of the first component identifies it. The present invention features in networking automation, simple installation, and convenient maintenance.

5 Claims, 5 Drawing Sheets

AUTOMATIC NETWORKING APPARATUS FOR VEHICLES

FIELD OF THE INVENTION

The present invention relates to an automatic networking apparatus for vehicles, through which information (e.g. pressure, temperature etc.) the user need to collect can be automatically sent to a display terminal.

BACKGROUND

As traffic develops more prosperously, management requirement for vehicles as carriers of transportation are getting stricter. Up till now, however, there is yet no good method to address frequent exchange of vehicles. In particular, for those vehicles with trailers, a tractor may take a different trailer from time to time, and there is even a situation where the tractor takes a plurality of trailers simultaneously, which will make monitoring of the vehicles extraordinarily difficult. Generally, a display terminal is always in a driver's cab so to make it easier for the driver to watch; however, the vehicle information needs to be displayed usually varies, thus how to accurately display the information of the hitched trailer on the display terminal is a problem difficult to solve in monitoring the vehicles.

In the present scenario, a common approach is that a data collection device disposed on the trailer collects information about the trailer, and a data collection device disposed on the tractor collects information about the tractor, and these two devices are connected via wires and data transmission is carried out through these wires and to the display of the tractor for displaying. When the trailer is replaced, the connection harness is also changed.

Though the problem caused by replacement of the trailers can be solved in this manner, an obvious limitation of this manner is that a large amount of harness should be disposed on the vehicles and the installation is quite inconvenient. Plug-socket connection for the harness is required when replacing the trailers. This approach is not only high in installation cost, but also low in maintenance efficiency.

On the other hand, wireless networking monitoring for the vehicles has also been proposed. But the proposed wireless approach only solved the problem of harness installation of the wired solution, while at the same time, brought along a problem regarding how to verify the identity of the trailer accurately. Generally, when the wireless approach is adopted, an identity code matching operation requiring more specialized skills has to be carried out after replacing the trailer(s) in order to realize networking for the vehicles.

SUMMARY OF THE INVENTION

The present disclosure provides a simplified and more flexible automatic networking apparatus for vehicles.

In order to solve the aforementioned problem, there is provided an automatic networking apparatus for vehicles which can be used with vehicles having a first component and a second replaceable component, wherein the automatic networking apparatus comprises a first identity recognition module disposed on the first component and a second identity recognition module disposed on the second component, wherein the first identity recognition module comprises a low-frequency sensor circuit, a high-frequency signal transmission circuit and a controller. The low-frequency sensor circuit will respond to a low-frequency wake-up signal. The controller connects the low-frequency sensor circuit and the high-frequency signal transmission circuit, and in response to the low-frequency wake-up signal control the high-frequency signal transmission circuit to transmit an identity code corresponding to the first component. The second identity recognition module comprises a low-frequency signal transmission circuit, a high-frequency signal receiving circuit and a controller. The low-frequency signal transmission circuit can transmit the low-frequency wake-up signal, and the high-frequency signal receiving circuit can receive the aforementioned identity code which has been transmitted by the aforementioned high-frequency signal transmission circuit. The controller connects the low-frequency signal transmission circuit and the high-frequency signal receiving circuit, and the controller is used for activating the low-frequency signal transmission circuit and storing the identity code received by the high-frequency signal receiving circuit.

In the aforementioned automatic networking apparatus, the first component is a tractor of a vehicle and the second component is a trailer of a vehicle.

In the aforementioned automatic networking apparatus, the second identity recognition module further comprises a high-frequency signal transmission circuit by which the second identity recognition module receives data collected from the second component and forwards the data loaded with the identity code.

In the aforementioned automatic networking apparatus, when the second component of the vehicle is connected to the first component, power is supplied by the first component to it, and a power supply line of the second identity recognition module is connected to the power supply circuit of the second component, and when powered on, the controller of the second identity recognition module determines the second component being connected to the first component and activates the low-frequency signal transmission circuit.

In the aforementioned automatic networking apparatus, the first identity recognition module further comprises a battery power supply circuit.

In the aforementioned automatic networking apparatus, the first identity recognition module is disposed within an area covered by the low-frequency signal of the second identity recognition module.

With the aforementioned technical schemes, the present invention has the following notable advantages over the prior arts:

1. Automatic code matching is realized by adopting a low-frequency wake-up process, such that the monitoring procedure is completely automated and no manual operation is needed, and the user does not need to make any operation in use requiring specialized skills, therefore errors otherwise could occur during the manual code matching are avoided, resulting in simplified and convenient usage, while such automation of the whole procedure also lead to low maintenance cost during use and efficient utilization of the vehicle.

2. Since a wireless mode is adopted in signal transmission between the first identity recognition module and the second identity recognition module, installation workload is reduced enormously, and a large amount of harness is no longer necessary, resulting in low hardware cost and labor cost for installation thereof.

BRIEF DESCRIPTION OF THE DRAWINGS

In order to make the aforementioned objects, characteristics and advantages of the present invention more apparent and easier to understand, a detailed description of the embodiments of the present invention will be given in conjunction with the accompanying drawings in which.

DETAILED DESCRIPTION

Figure 1:
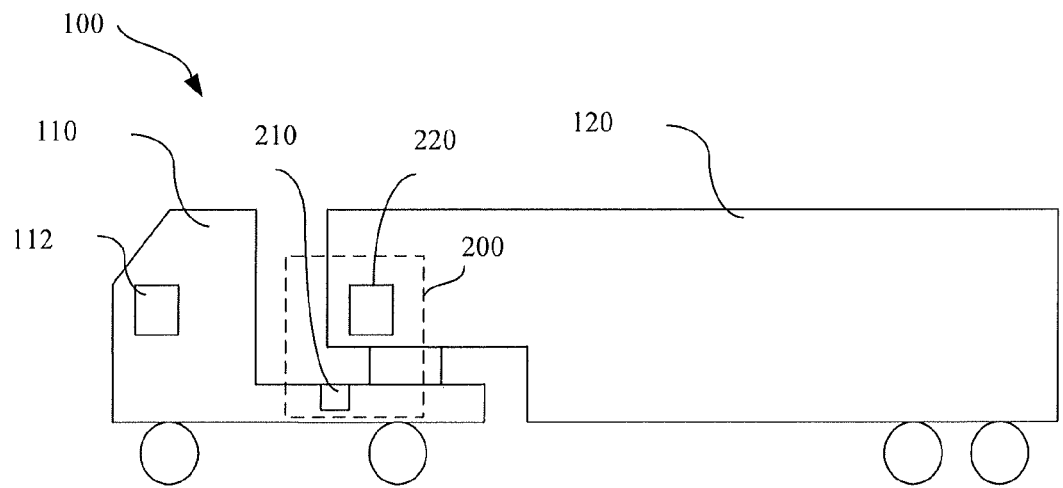
FIG. 1 is a structural diagram of one embodiment of the automatic networking apparatus for vehicles.

FIG. 1 is a structural diagram of one embodiment of the automatic networking apparatus for vehicles. Referring to FIG. 1, an automatic networking apparatus 200 is disposed in an environment of a vehicle 100 which comprises a tractor 110 and a trailer 120. In other embodiments, the automatic networking apparatus can also be used in a vehicle where a first component and a second replaceable component need to be networked. The automatic networking apparatus 200 comprises a first identity recognition module 210 and a second identity recognition module 220. The first identity recognition module 210 is disposed on the tractor 110, and the second identity recognition module 220 is disposed on the trailer 120. In addition, a receiving and displaying apparatus 112 is disposed on the tractor 110.

Figure 2:
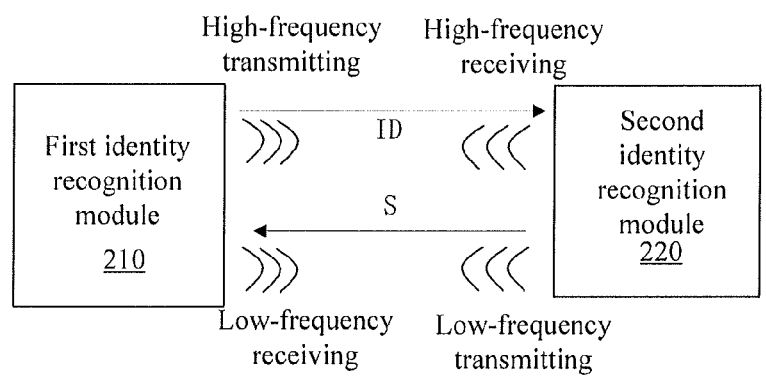
FIG. 2 is a data communication flow chart of one embodiment of the automatic networking apparatus for vehicles.

FIG. 2 is a data communication flow chart of one embodiment of the automatic networking apparatus for vehicles. In brief, the first identity recognition module 210 functions to wirelessly transmit an identity code corresponding to the vehicle tractor 110. The wireless transmission signal can be a high frequency signal. The second identity recognition module 220 functions to forward data associated with the trailer 120 which need to be collected. These data can be acquired from measurement by the temperature and pressure sensors disposed on each of the wheels of the trailer 120, and transmitted to the second identity recognition module 220 in a wired or wireless mode. According to the conception of the present disclosure, the first identity recognition module 210 does not continuously transmitting the aforementioned identity code, instead, it waits for a trigger condition. The second identity recognition module 220 can trigger the first identity recognition module 210 through signals. Here, the low-frequency signal which has a short wireless transmission range (possibly shorter than the width of the vehicle body) can be used as a wake-up signal S because of its high reliability.

The aforementioned triggering is done by the second identity recognition module 220 as the trailer 120 is connected to the tractor 110 so as to begin networking. Though the triggering can be completed manually, in one embodiment of the present invention, the second identity recognition module 200 determines, through certain information, the trailer 120 has been connected to the tractor 110. For instance, generally, the tractor 110 supplies power to electronic components of the trailer 120. Each of the electronic device, such as the power supply line of the second identity recognition module 220, is connected to the power supply circuit of the trailer 120 to get power supply. When the second identity recognition module 220 is powered on, it considers the trailer 120 has been connected to the tractor 110 and turns into a networking mode and transmits the low-frequency wake-up signal S to wake up the first identity recognition module 210.

After the first identity recognition module 210 turns into the networking signal transmission mode, it transmits an identity code ID corresponding to the tractor with a high-frequency scheme, and the ID is received by the second identity recognition module 220 and stored therein. Thus, the second identity recognition module 220 recognizes the tractor which is currently connected.

According to an embodiment of the invention, there is no need to pre-store, for each other, the respective identity recognition information before networking between the first identity recognition module and the second identity recognition module, instead, the networking is accomplished by mutually learning the identity recognition information after networking of both modules.

Figure 3:
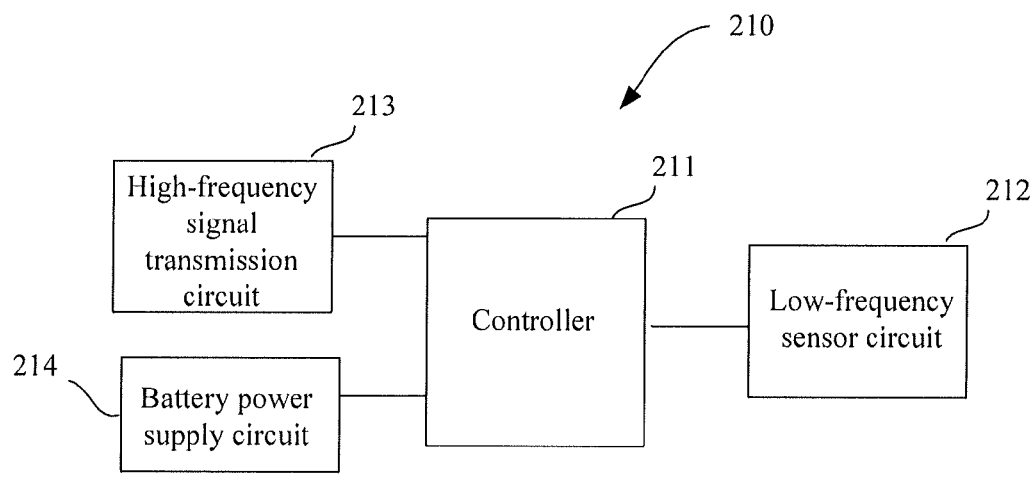
FIG. 3 is a structural diagram of one embodiment of a first identity recognition module.

FIG. 3 is a structural diagram of one embodiment of the first identity recognition module. Referring to FIG. 3, the first identity recognition module 210 comprises a controller 211, a low-frequency sensor circuit 212, a high-frequency signal transmission circuit 213 and a battery power supply circuit 214. The controller 211 connects the low-frequency sensor circuit 212, the high-frequency signal transmission circuit 213 and the battery power supply circuit 214. The low-frequency sensor circuit 212 detects the low-frequency wake-up signal S. In response to the low-frequency wake-up signal, the controller 211 makes the module turn into networking signal transmission mode and transmit the identity code corresponding to the tractor through the high-frequency signal transmission circuit 213. A battery power supply can be adopted to avoid troublesome line connecting, due to the extremely low power consumption of the first identity recognition module 210.

Figure 5:
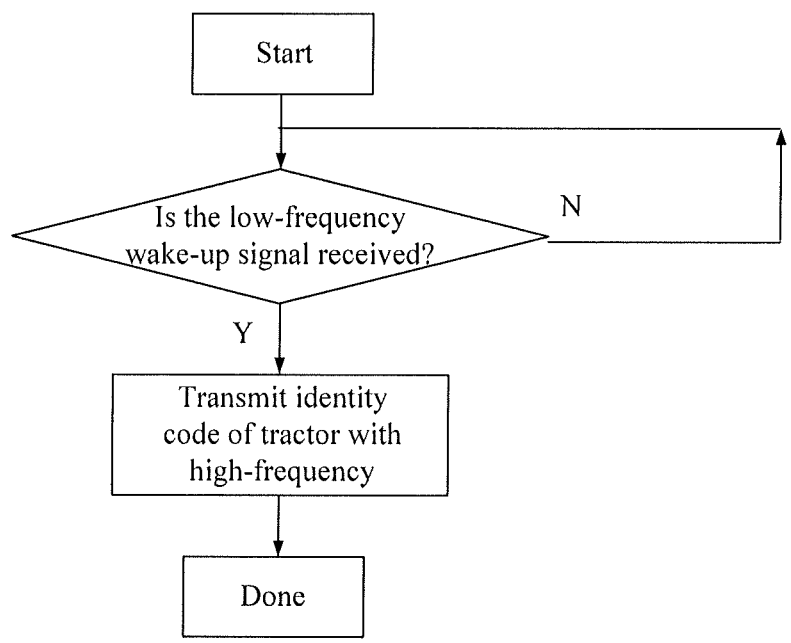
FIG. 5 is an exemplary implementation flow chart of a first identity recognition module.

FIG. 5 is an exemplary implementation flow chart of a first identity recognition module.

Figure 4:
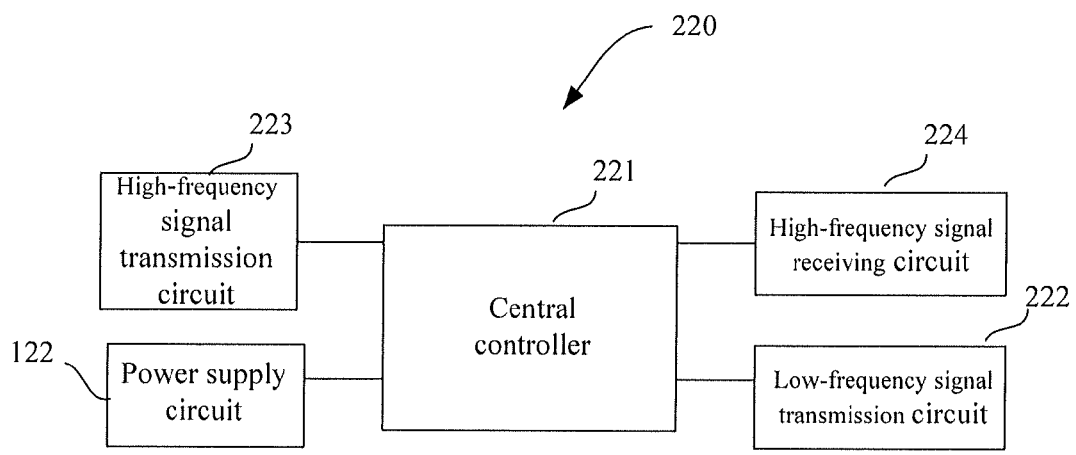
FIG. 4 is a structural diagram of one embodiment of a second identity recognition module.

FIG. 4 is a structural diagram of one embodiment of the second identity recognition module. Referring to FIG. 4, the second identity recognition module 220 comprises a controller 221, a low-frequency signal transmission circuit 222, a high-frequency signal transmission circuit 223 and a high-frequency signal receiving circuit 224. The controller 221 connects the low-frequency signal transmission circuit 222, the high-frequency signal transmission circuit 223 and the high-frequency signal receiving circuit 224. The controller 221 is connected to a power supply circuit 122 of the trailer. When the controller is powered on, it considers the trailer has been connected to the tractor and turns into the networking mode and instructs the low-frequency signal transmission circuit 222 to transmit the low-frequency wake-up signal to wake up the first identity recognition module 210. Once the first identity recognition module 210 transmitted the identity code, the high-frequency signal receiving circuit 224 receives the identity code ID and sends it to the controller 221 for storage, and then the controller 221 leaves the networking mode.

Figure 6:
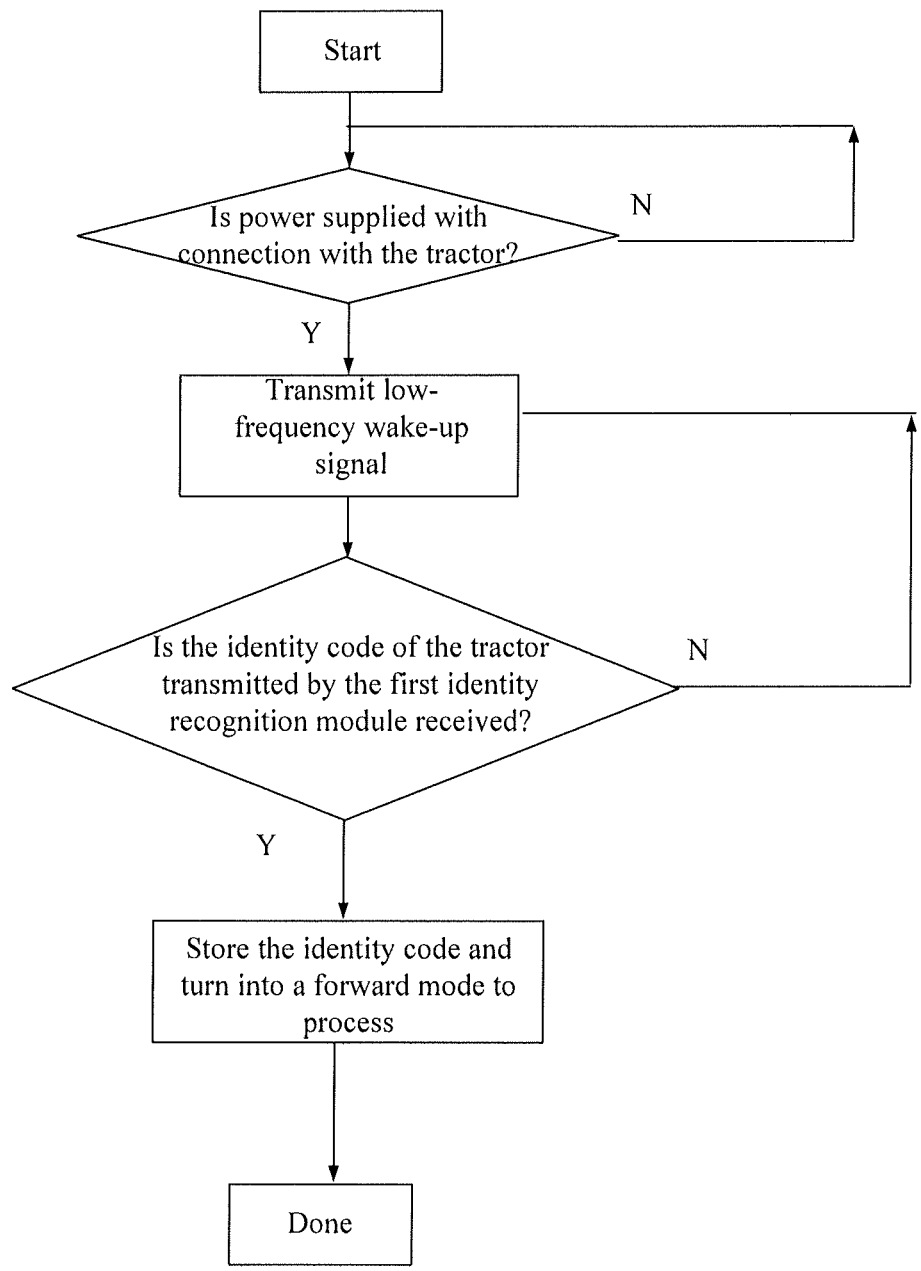
FIG. 6 is an exemplary implementation flow chart of a second identity recognition module.

FIG. 6 is an exemplary implementation flow chart of a second identity recognition module.

In one embodiment, the second identity recognition module 220 also receives data collected from the trailer through the high-frequency signal receiving circuit 224. However, it can be understood that there are various alternative methods to realize this object, for example, the second identity recognition module 220 may acquire the collected data through traditional wired schemes or other types of wireless signals. When the second identity recognition module 220 forwards the trailer data, the controller 221 will load the stored identity code of the tractor onto these data, and then forward the data through the high-frequency signal transmission circuit 223.

Figure 7:
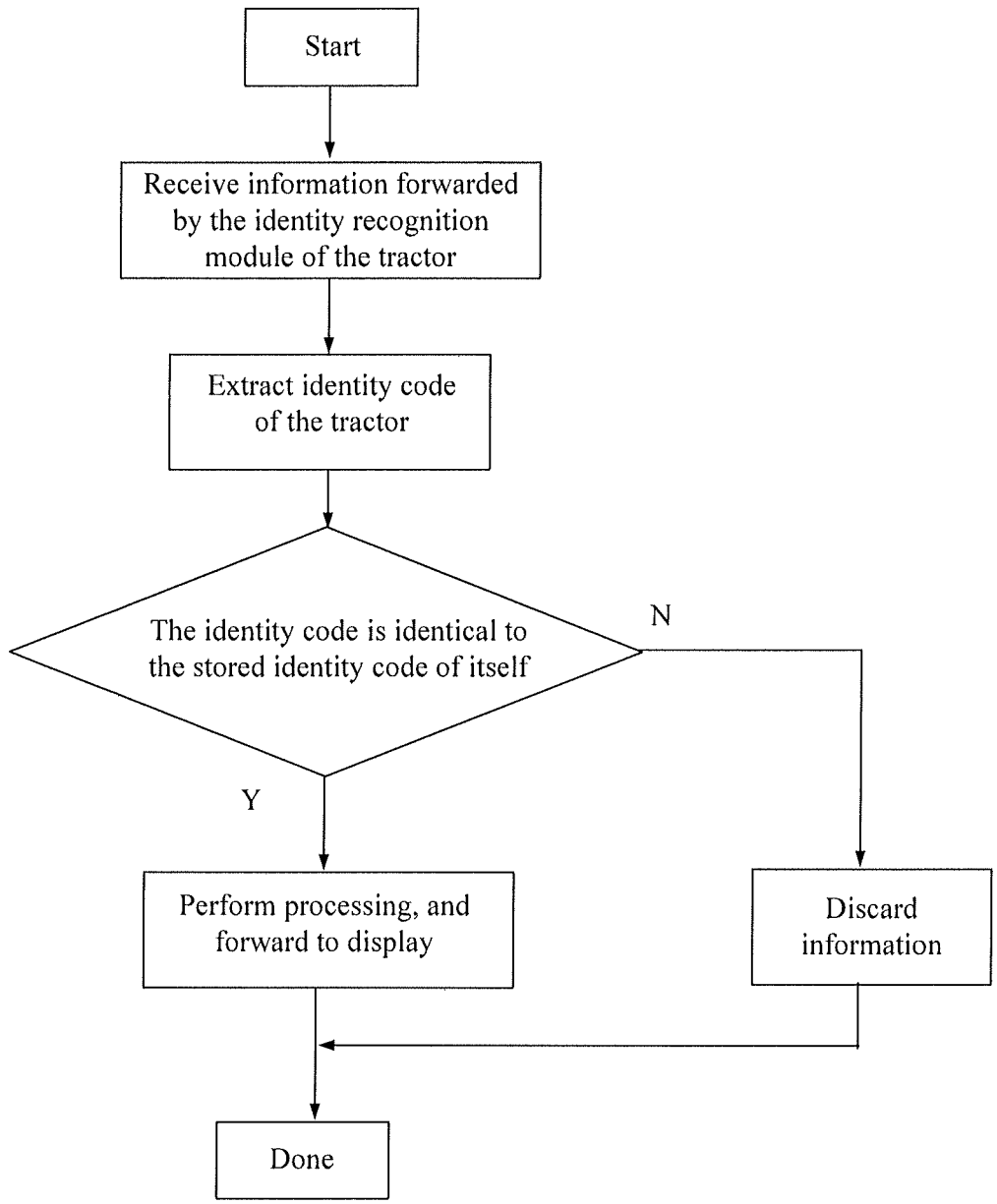
FIG. 7 is an exemplary flow chart between a receiving module and a displaying module.

When a receiving and displaying device 112 installed on the tractor 110 receives the data forwarded by the second identity recognition module 220, it will extract the identity code of the tractor and compare the identity code of the tractor received with the pre-stored identity code; if it is confirmed that the data belong to the present vehicle, the display processing will begin, otherwise the data will be discarded. FIG. 7 is an exemplary flow chart between a receiving module and a displaying module.

Installation positions of the aforementioned first identity recognition module 210 and the second identity recognition module 220 should take the coverage range of the wireless signal into consideration. For example, the first identity recognition module 210 should be positioned in the coverage range of the low-frequency signal of the second identity recognition module 220. The second identity recognition module 220 should be installed such that the high-frequency signal covers the receiving and displaying apparatus 112, while it should be covered by the high-frequency signal of the first identity recognition module 210 itself. Generally, the first identity recognition module 210 is installed at the tail end of the tractor which is close to the trailer, it needs to be fixed only and no harness is needed. The second identity recognition module 220 is positioned at the front end of the trailer, and in its installation one only needs to connect its power supply line to the general live wire of the trailer part and no other harness is necessary, thus the installation is quite easy.

Compared with the prior art, the embodiments of the present invention have the following notable advantages:

1. Automatic code matching is realized by adopting a low-frequency wake-up process, such that the monitoring procedure is completely automated and no manual operation is needed, and the user does not need to make any operation in use requiring specialized skills, therefore errors otherwise could occur during the manual code matching are avoided, resulting in simplified and convenient usage, while such automation of the whole procedure also lead to low maintenance cost during use and efficient utilization of the vehicle.

2. Since a wireless mode is adopted in signal transmission between the first identity recognition module and the second identity recognition module, installation workload is reduced enormously, and a large amount of harness is no longer necessary, resulting in low hardware cost and labor cost for installation.

While the present invention has already been described with the preferable embodiments as above, they are not meant to limit the present invention, and any skilled in the art can process some modification and improvement without departing form the spirit and bound of the present invention, thus the protection metes and bounds of the present invention should be defined by the claims.

What is claimed is:

1. An automatic networking apparatus for a vehicle including a first component and a second replaceable component, characterized in that the automatic networking apparatus comprises a first identity recognition module and a receiving module disposed on the first component, and a second identity recognition module disposed on the second component, wherein:
the first identity recognition module comprises:
a low-frequency sensor circuit to sense a low-frequency wake-up signal;
a high-frequency signal transmission circuit; and
a controller connecting the low-frequency sensor circuit and the high-frequency signal transmission circuit and responding to the low-frequency wake-up signal detected by the low-frequency sensor circuit and accordingly controlling the high-frequency signal transmission circuit to transmit an identity code corresponding to the first component;
the second identity recognition module comprises:
a low-frequency signal transmission circuit transmitting the low-frequency wake-up signal;
a high-frequency signal receiving circuit for receiving the identity code of corresponding to the first component sent from the high-frequency signal transmission circuit and for collecting data from the second component;
a high-frequency signal transmission circuit for forwarding the collected data loaded with the identity code corresponding to the first component; and
a controller connecting the low-frequency signal transmission circuit and the high-frequency signal receiving circuit to activate the low-frequency signal transmission circuit, store the identity code corresponding to the first component received by the high-frequency signal receiving circuit, and collect the data from the second component and load the collected data of the second component with the identity code corresponding to the first component;
the receiving module is configured to receive the collected data loaded with the identity code corresponding to the first component forwarded by the high-frequency signal transmission circuit.

2. The automatic networking apparatus for vehicles of claim 1, wherein the first component is a tractor of a vehicle, the second component is a trailer of a vehicle.

3. The automatic networking apparatus for vehicles of claim 1, wherein when the second component of the vehicle is connected to the first component power is supplied by the first component, and a power supply line of the second identity recognition module is connected to the power supply circuit of the second component, and when the controller of the second identity recognition module is powered on, the second component is determined to be connected to the first component and activate the low-frequency signal transmission circuit.

4. The automatic networking apparatus for vehicles of claim 1, wherein the first identity recognition module further comprises a battery power supply circuit.

5. The automatic networking apparatus for vehicles of claim 1, wherein the first identity recognition module is disposed in a range covered by the low-frequency signal of the second identity recognition module.

* * * * *